(12) United States Patent
Brusco

(10) Patent No.: US 8,935,878 B2
(45) Date of Patent: Jan. 20, 2015

(54) SPACER DEVICE FOR VINE SUPPORT WIRES, METHODS FOR ITS OPERATION AND VINE SUPPORT ASSEMBLIES COMPRISING THE SAME

(75) Inventor: Massimo Brusco, Canelli (IT)

(73) Assignees: Mollificio Effemme S.R.L., Canelli (IT); Technovineyard, Inc., Loomis, CA (US)

( * ) Notice: Subject to any disclaimer, the term of this patent is extended or adjusted under 35 U.S.C. 154(b) by 0 days.

(21) Appl. No.: 13/518,853

(22) PCT Filed: Jun. 17, 2011

(86) PCT No.: PCT/IB2011/052651
§ 371 (c)(1),
(2), (4) Date: Jun. 22, 2012

(87) PCT Pub. No.: WO2011/158214
PCT Pub. Date: Dec. 22, 2011

(65) Prior Publication Data
US 2012/0247015 A1  Oct. 4, 2012

(30) Foreign Application Priority Data
Jun. 18, 2010 (IT) .............................. MI2010A1118

(51) Int. Cl.
*A01G 17/06* (2006.01)
*A01G 17/14* (2006.01)

(52) U.S. Cl.
CPC ...................................... *A01G 17/06* (2013.01)
USPC ................................. 47/45; 47/44; 47/58.1 R

(58) Field of Classification Search
CPC ....... A01G 17/06; A01G 17/04; A01G 9/128;
A01G 9/122; A01G 17/10; A01G 17/14;
A01G 17/08; A01G 17/085; A01G 17/005;
A01G 17/02; A01G 31/02; A01G 31/06
USPC .................. 47/44, 46; 256/32, 47, 48, 57, 54;
248/218.4, 219.2, 301, 302, 304, 505,
248/153
See application file for complete search history.

(56) References Cited

U.S. PATENT DOCUMENTS

| 580,847 | A | * | 4/1897 | Clark | 256/53 |
| 3,302,328 | A | * | 2/1967 | King | 47/47 |
| 4,329,762 | A | * | 5/1982 | Maidhof | 24/16 PB |

(Continued)

FOREIGN PATENT DOCUMENTS

| EP | 0 876 756 A1 | 11/1998 |
| EP | 1 591 005 A2 | 11/2005 |

(Continued)

OTHER PUBLICATIONS

PCT Search Report for International Application PCT/IB2011/052651 filed on Jun. 17, 2011 in the name of Mollificio Effemme S.r.l. Mail date: Nov. 2, 2011.

(Continued)

*Primary Examiner* — David Parsley
*Assistant Examiner* — George Andonyan
(74) *Attorney, Agent, or Firm* — Steinfl & Bruno, LLP

(57) ABSTRACT

A spacer device for vine support wires adapted to be fixed to a vine post is described. Methods for operating a spacer device for vine support wires adapted to be fixed to a vine post are also described.

15 Claims, 10 Drawing Sheets

(56) References Cited

U.S. PATENT DOCUMENTS

| | | | | |
|---|---|---|---|---|
| 5,542,210 | A | * | 8/1996 | Hupfl ................................ 47/47 |
| 6,293,521 | B1 | * | 9/2001 | Parrish .......................... 254/199 |
| 6,481,696 | B1 | * | 11/2002 | Lion et al. ....................... 256/11 |
| 2002/0112400 | A1 | * | 8/2002 | Fidler ................................ 47/46 |
| 2010/0107490 | A1 | * | 5/2010 | Martin Alvarez ................. 47/46 |

FOREIGN PATENT DOCUMENTS

| | | | |
|---|---|---|---|
| EP | 1661451 | * | 5/2006 |
| EP | 1832160 | * | 9/2007 |
| ES | 1 072 221 U | | 6/2010 |
| FR | 2674098 | * | 9/1992 |
| WO | WO 2005086991 | * | 9/2005 |
| WO | 2009/106380 | | 9/2009 |
| WO | WO 2009106380 | * | 9/2009 |

OTHER PUBLICATIONS

PCT Written Opinion for International Application PCT/IB2011/052651 filed on Jun. 17, 2011 in the name of Mollificio Effemme S.r.l. Mail date: Nov. 2, 2011.

* cited by examiner

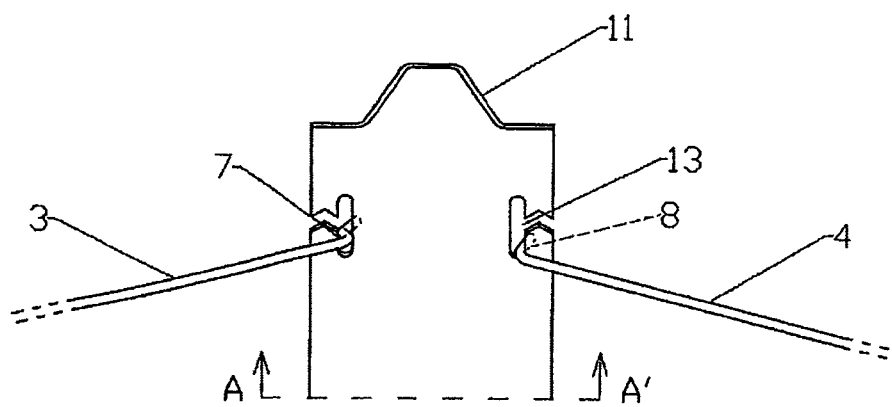
FIG. 2bis
FIG. 2ter

SPACER DEVICE FOR VINE SUPPORT WIRES, METHODS FOR ITS OPERATION AND VINE SUPPORT ASSEMBLIES COMPRISING THE SAME

CROSS REFERENCE TO RELATED APPLICATIONS

The present application is the US national stage of International Application PCT/IB2011/052651 filed on Jun. 17, 2011, which, in turn, claims priority to Italian Patent Application MI2010A001118 filed on Jun. 18, 2010.

FIELD OF THE INVENTION

The technical field of the present invention is that of spacers used in the field of viticulture for spacing apart the vine support wires which extend from opposite sides of a series of posts, planted in aligned and spaced apart positions in the soil of a vineyard.

More specifically, the invention relates to a spacer device for vine support wires according to the preamble of claim 1. The invention also relates to vine support assemblies and methods for the operation of a spacer device.

The spacers (generally known as "spring spacers" since they are often made with wire which is resilient or resiliently deformable) are usually installed on the posts in the winter period, after pruning, or in the spring period, before the plant begins to shoot. Once positioned on the posts of the vineyard, at predetermined heights, the spacers are placed in an open position, with the arms spread open, in order to hold apart the vine wires, which pass into the rings of the spacers at a distance of approximately forty centimeters. In this phase the vine wires are not loaded. At the time of shooting, towards April and May, the major part of the shoots comes between the two wires and once it has passed over them is supported by same.

In this phase the spacers placed at the lower height are closed in order to contain the vegetation which passes beyond the vine wires and to ensure that it does not interfere with the grape clusters which are below. By closing the spacers, i.e. bringing their arms close to one another, the distance between the vine wires is reduced. The following phase is that of closing the spacers placed at a higher level, usually in June or July, once the shoots have grown longer. The vegetation is therefore supported and contained by the binary vineyard wires in a compact and uniform manner, making it possible for the plant to grow straight and in an upward direction. In this way the clusters are well exposed to the sun and to the treatments carried out by the grower.

STATE OF THE ART

Spring type spacers of various kinds are known which are suitable for being fixed to vineyard posts. WO 2009/106380 describes a spring type spacer suitable for being fixed to a post for vines, comprising a first and a second separate wires. The first wire, resiliently deformable, has a base portion suitable for encircling the post in a substantially horizontal position, from which there extends a pair of arms shaped at their upper ends to form respective rings suitable for receiving and supporting the vine support wires. The second wire, also suitable for being mounted on the same post, is configured in such a way as to form attaching means, suitable for retaining the arms of the first wire in the region of an intermediate section thereof. The attachment of the arms of the first wire to the second enables the arms to be brought together and the support wires, carried by the rings, closer to each other compared to the spaced apart position of the arms in which the support wires are spaced from each other.

Unfortunately, owing to the fact that it is made in two separate parts, the spacer which is the subject of WO 2009/106380 involves high manufacturing costs and greater difficulty of installation, quite apart from the need to control accurately the mutual placing of the two wires, so that the spacer can be used effectively.

Besides the fact that spacers are not known which are optimised for posts of "omega"-shaped or "T"-shaped cross-section, i.e. for posts having lateral notches, the commercially available spacers have the drawback that, being hooked on to the post only in the lower region, they tip forwards when the weight of the vine tends to generate in the support wires the so-called "dune effect", which appears when between one centre line post and the other the weight of the vine in the growing stage presses on the wires and consequently the whole of the vine drops down, creating significant problems in the trimming stage.

SUMMARY

The principal object of the present invention is to provide a spacer for vine support wires which is stable, i.e. which is firmly attached to the post and which cannot tip even in the presence of thick vegetation; another object of the present invention is to provide a solution which lends itself to being optimised for vineyard posts having a "T"-shaped or "omega"-shaped cross-section; a further object is to provide a solution which adapts to the various stages of growth of the vine.

These and other objects are achieved by means of a spacer device having the features indicated in the appended claims which form an integral part of the present description.

Further subjects of the invention are vine support assemblies and methods for the operation of a spacer device for vine support wires, as claimed.

LIST OF DRAWINGS

Further objects, advantages and features of the present invention will become clear from the following description of some exemplary embodiments, provided by way of non-limiting example, and from the Figures of the appended drawings, in which.

Figure 1:
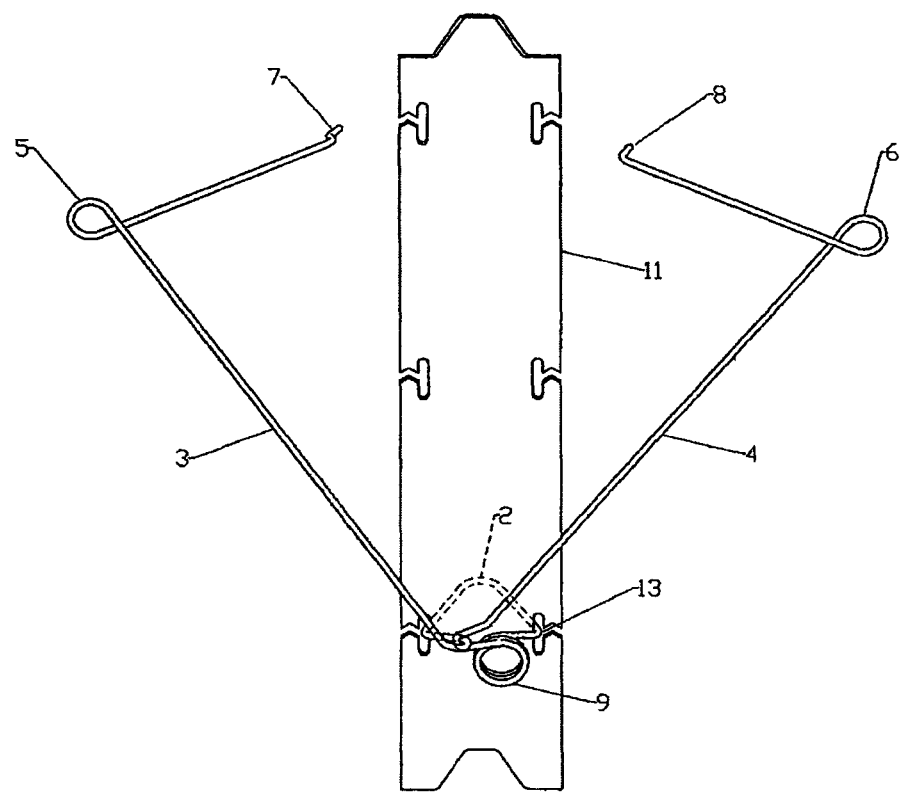
FIG. 1 illustrates a first exemplary embodiment of the device installed on a post of "omega"-shaped cross-section in the open position.
Figure 2:
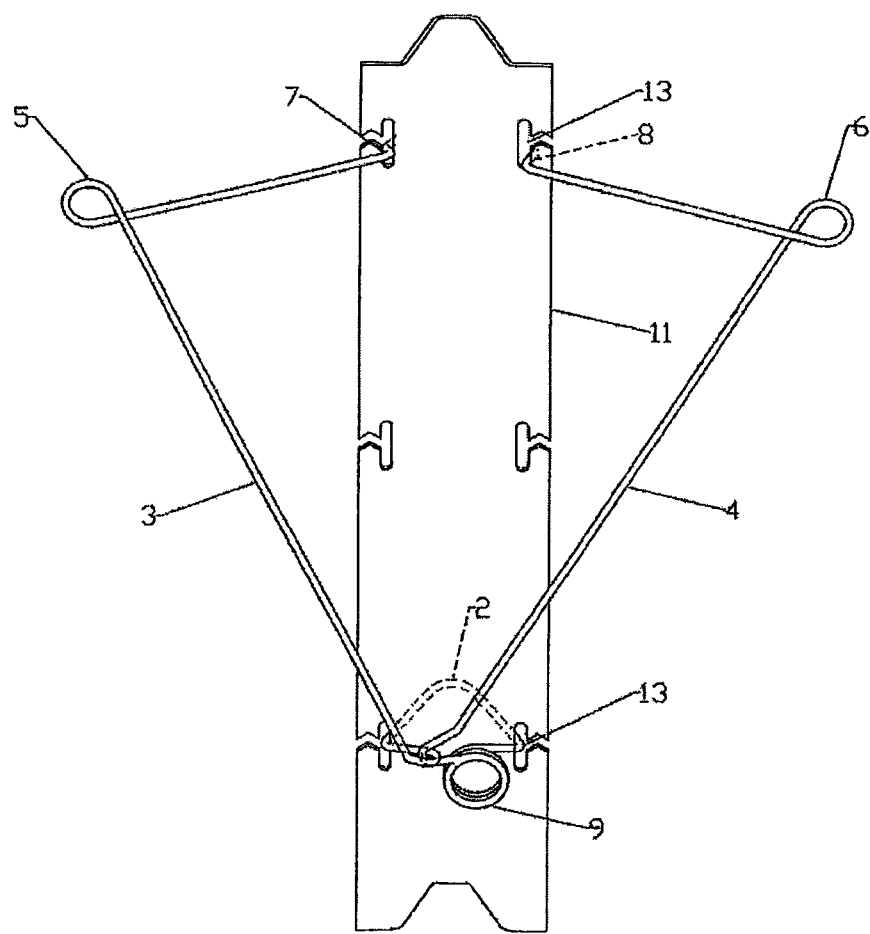
FIG. 2 illustrates a first exemplary embodiment of the device installed on a post of "omega"-shaped cross-section in the first closure position.
Figure 3:
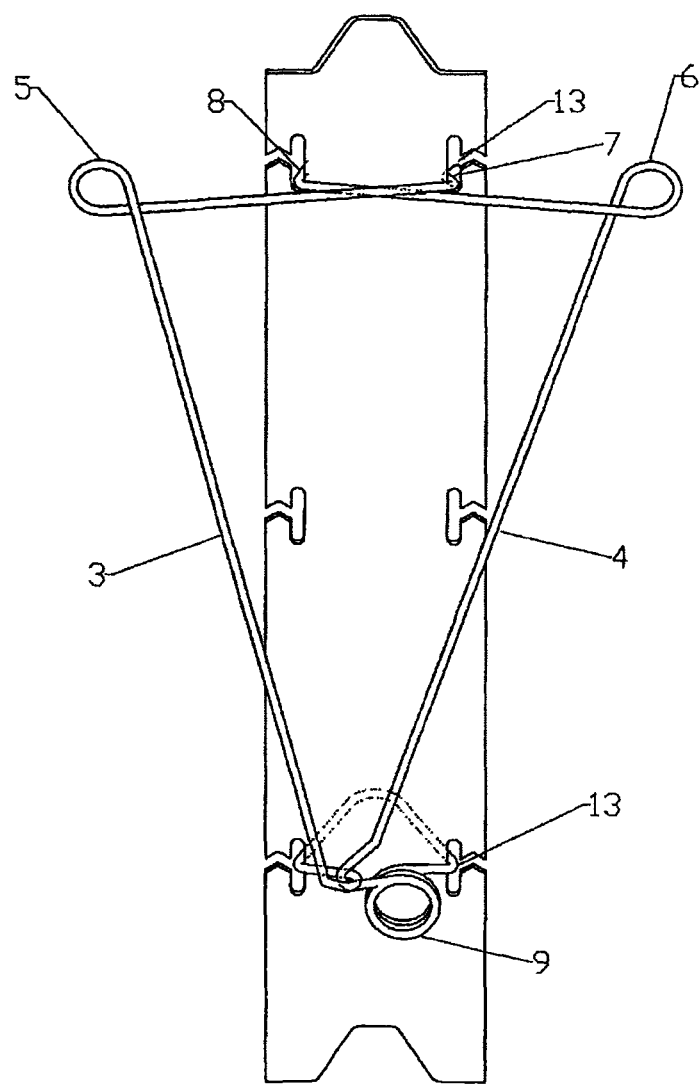
Figure 4:
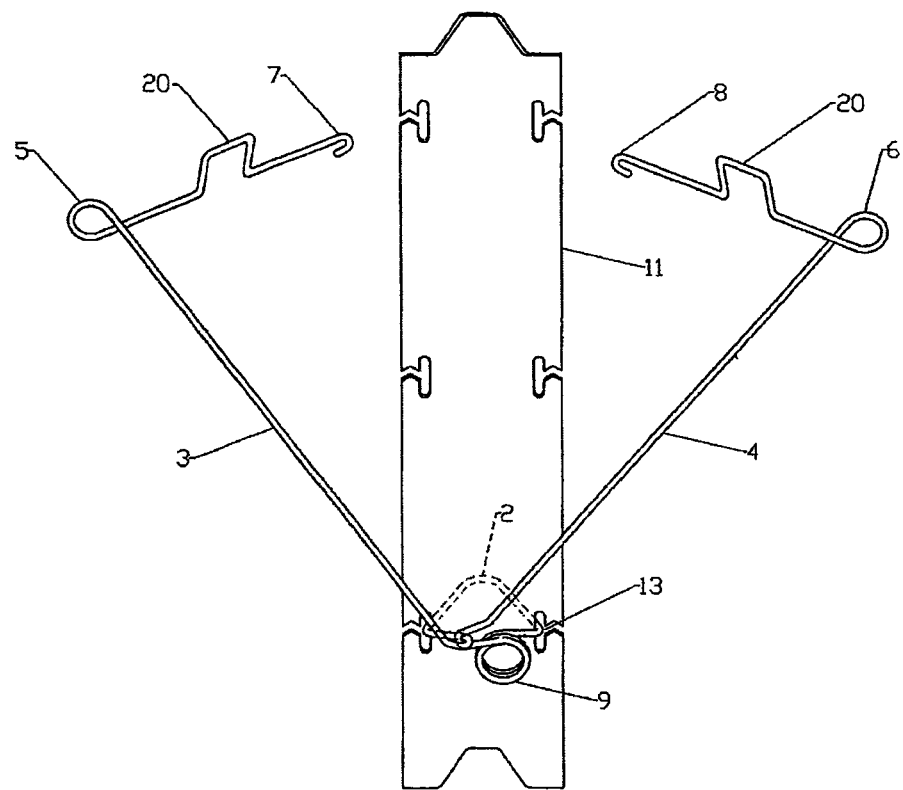
Figure 5:
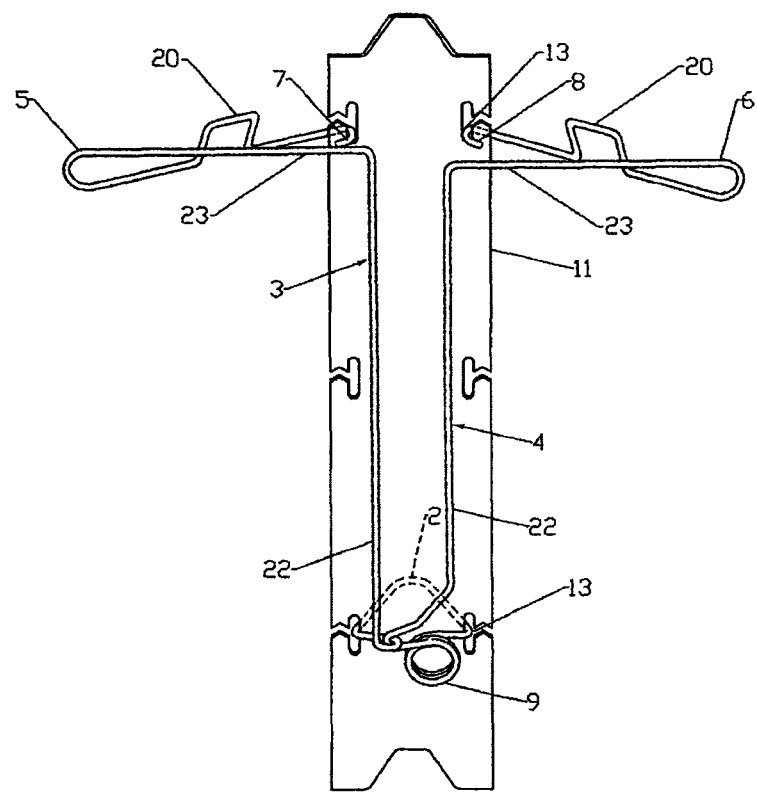
Figure 6:
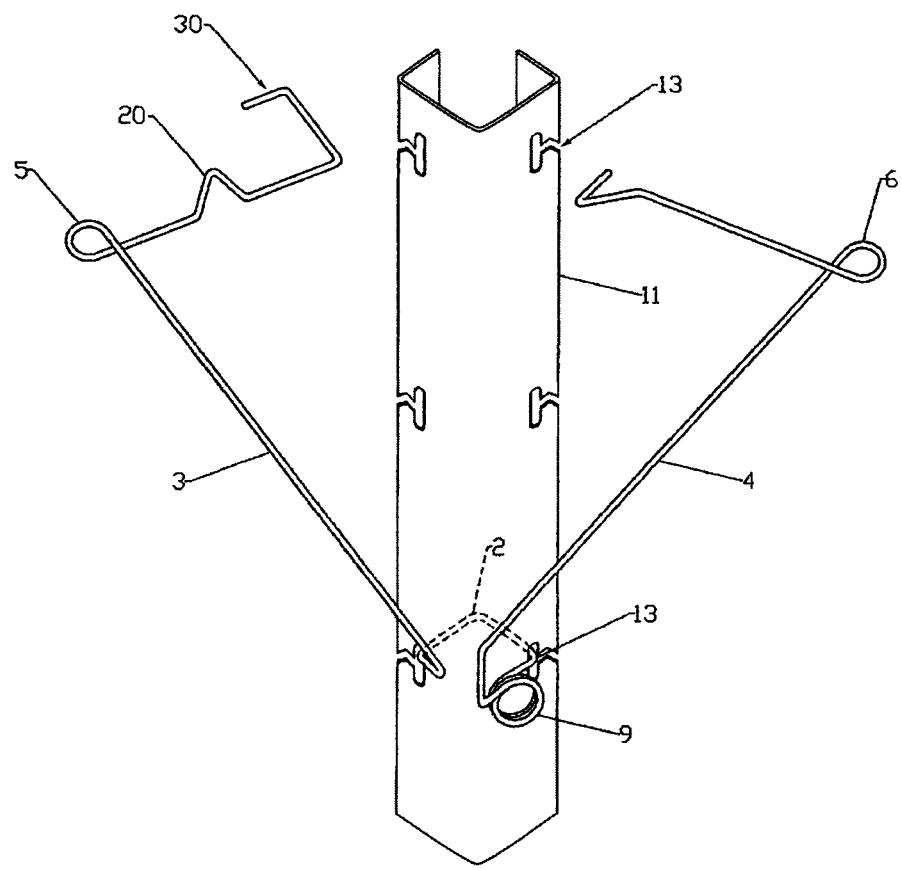
Figures 7, 7A:
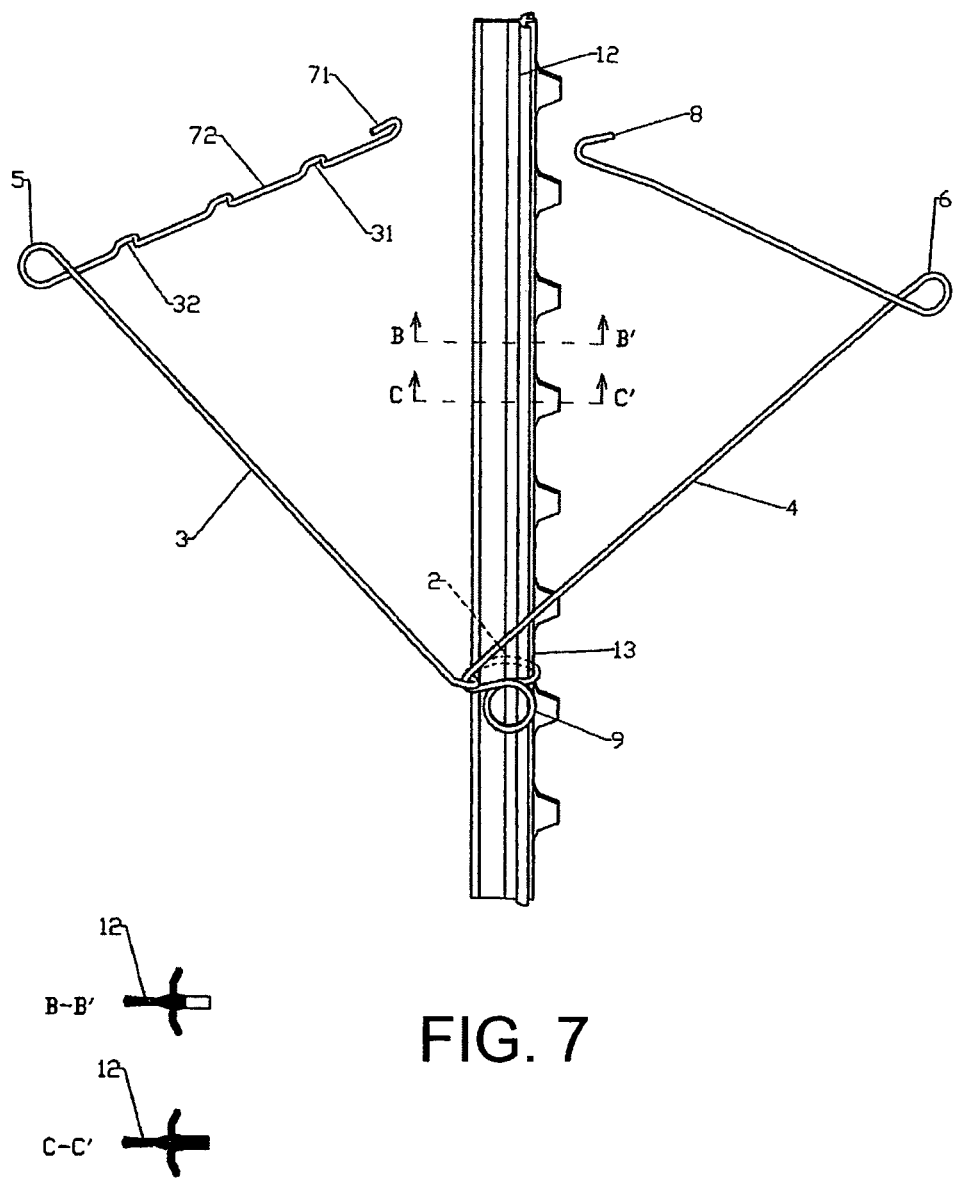
Figure 8:
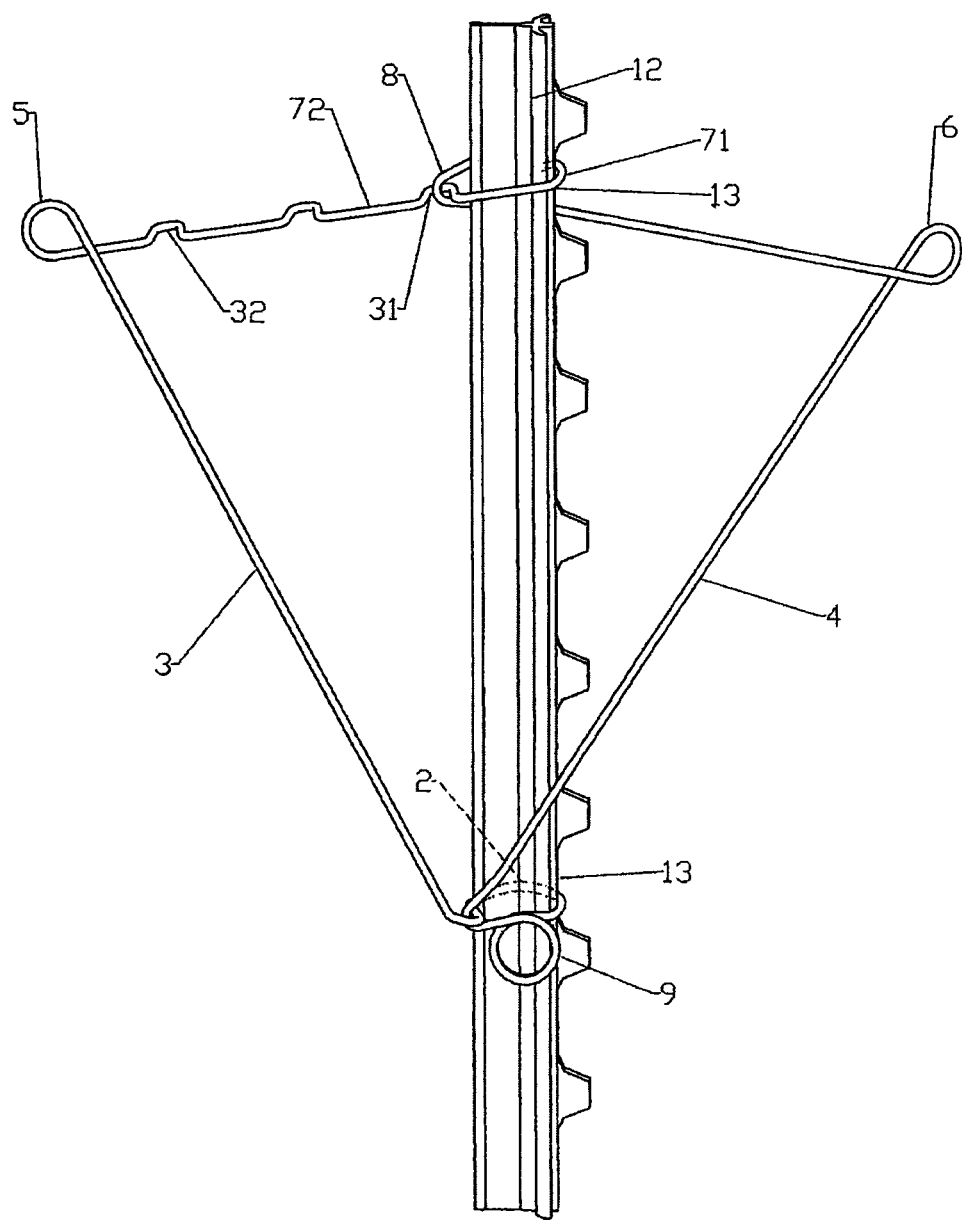
Figure 9:
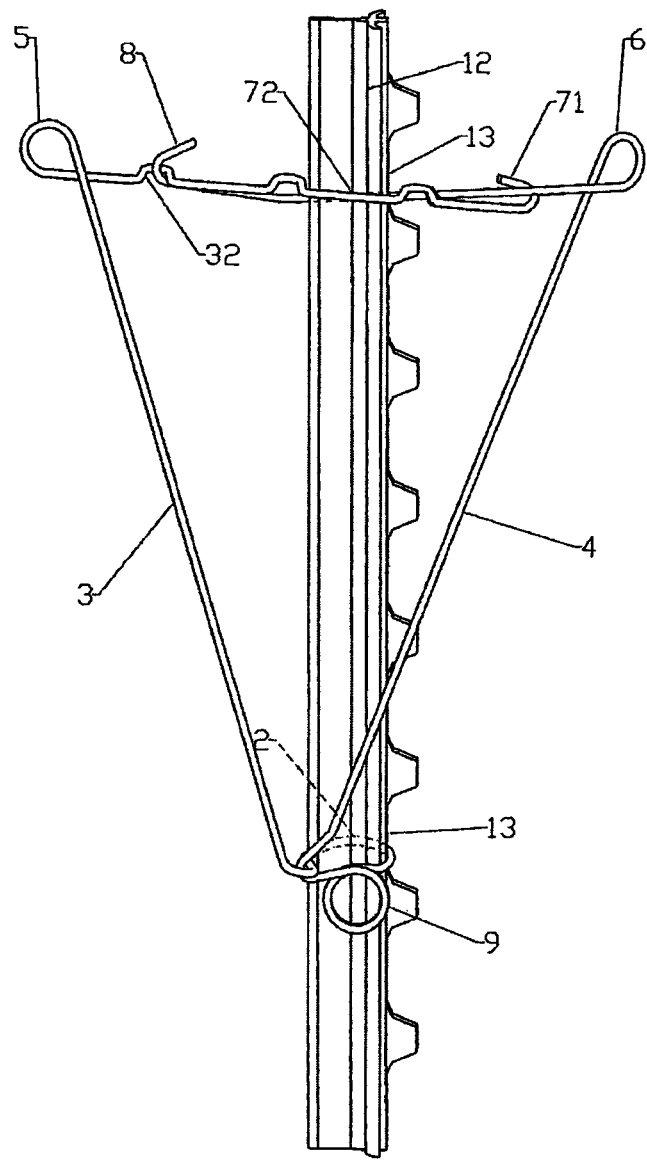

FIG. 2*bis* illustrates the detail of the hooking on to the post of "omega"-shaped cross-section of the upper part of the device in the first closure position illustrated in FIG. 2;

FIG. 2*ter* illustrates the cross-section AA' of the post of FIG. 2*bis*;

FIG. 3 illustrates a first exemplary embodiment of the device installed on a post of "omega"-shaped cross-section in the second closure position;

FIG. 4 illustrates a first variant of the device of FIG. 1;

FIG. 5 illustrates a second variant of the device of FIG. 1;

FIG. 6 illustrates a third variant of the device of FIG. 1;

FIG. 7 illustrates a second exemplary embodiment of the device installed on a post of "T"-shaped cross-section in the open position;

FIG. 7a illustrates the cross-sections BB' and CC' of the post of FIG. 7;

FIG. 8 illustrates a second exemplary embodiment of the device installed on a post of "T"-shaped cross-section in the first closure position;

FIG. 9 illustrates a second exemplary embodiment of the device installed on a post of "T"-shaped cross-section in the second closure position.

DETAILED DESCRIPTION

The spacers of the present invention are preferably made in one piece from a length of wire which is resilient or resiliently deformable, suitably shaped for being mounted at different heights on posts preferably of "omega"-shaped or "T"-shaped cross-section and equipped with attachment seats such as recesses and/or projections, in particular longitudinally along the lateral edges.

FIGS. 1, 2 and 3 indicate by the reference numeral 11 a vineyard post having an "omega"-shaped cross-section, which has on both the lateral edges recesses or notches 13, and a spacer optimised therefor.

Similar posts, which have on one or both lateral edges recesses or notches 13, or raised portions with a similar function of attachment seats for spacer devices, can be produced with profile sections having an open C-shaped cross-section or a polygonal cross-section (for example, square section) open at a vertex, or even a closed polygonal cross-section.

The spacer is constituted by a deformable and resilient wire, suitably shaped in such a way as to have a ring type central element 2 adapted to be wound round the post 11, passing through the recesses 13 in such a way as to be secured in the vertical displacement.

Mounting on the post is carried out manually by widening the central ring 2 in such a way as to position the wire inside the recesses 13.

A coil 9 optionally inserted into the ring 2 enables the latter to be more resilient and deformable in order to facilitate the attachment stage. The coil 9 is positioned preferably in the groove of the post 11 having an "omega"-shaped cross-section and lies in a plane substantially perpendicular to the ring 2 which encircles the post 11.

According to alternative exemplary embodiments, there may be several coils, similar to the coil 9, provided at other points of the ring 2 and adapted to increase its resilience.

The closure of the ring type central element 2 around the post 11 is effected by crossing at the lower end two inclined arms 3 and 4 which start from the aforesaid central element 2. The two arms 3, 4 are shaped and extend in directions first diverging from the post 11 and then converging towards it (they are approximately L-shaped). Each of the arms 3 and 4, preferably in the middle part, is equipped with a respective ring 5, 6 adapted to receive and support the vine support wires (not illustrated). A first arm 3 has at the end a hook-shaped coupling means 7, adapted to be hooked on to the post 11 in the region of one of the recesses 13 described above. In the attached state, the first arm 3 is firmly fixed to the post 11 and is not subject to tipping phenomena. The second arm 4 also has in the end portion a hook-shaped coupling means 8, also adapted to be hooked on to the post 11 in the region of one of the recesses 13 described above. Thus, the second arm 4 is also arranged to be firmly fixed to the post and is not subject to tipping phenomena. In addition, as can be seen by comparing FIGS. 2 and 3, the hooks 7 and 8 can be hooked on to the post 11 in at least two different positions so that the distance between the rings 5 and 6 is variable.

This particular feature of the spacer is very useful when it is wished to maintain the vine support wires spaced apart to a lesser or greater degree, according to the amount of vegetation present and/or according to the season.

FIG. 1 illustrates the spacer in the open position, as it is mounted in the winter period, after pruning, or in the spring period, before the plant begins to shoot.

FIG. 2 illustrates a first closure position of the spacer firmly anchored to the post 11 in which the hook 7 of the first arm 3 is hooked on to an attachment seat (for example a recess) 13 of the post 11, placed on the side of the post 11 closest to the hook 7, and in which the hook 8 of the second arm 4 is hooked on to a recess 13 of the post 11 placed on the side of the post closest to the hook 8.

FIG. 2bis illustrates the upper portion of the spacer in the first closure position of FIG. 2, and FIG. 2ter illustrates the post 11 in cross-section, in such a way that the "omega"-shape of the cross-section can be seen.

FIG. 3 illustrates a second closure position of the spacer again firmly anchored to the post 11, in which the hook 7 of the first arm 3 is hooked on to a recess 13 of the post 11 placed on the side of the post furthest from the hook 7 and in which the hook 8 of the second arm 4 is hooked on to a recess 13 of the post 11 placed on the side of the post furthest from the hook 8, in such a way that the end portions of the arms 3 and 4 (in which the hooks 7 and 8 are formed) are crossed.

The spacer illustrated in FIGS. 1, 2 and 3 can therefore work in two different closure positions in which the distance between the rings 5 and 6 is variable: further apart in FIG. 2 and closer together in FIG. 3; for both the closure positions, firm fixing to the post is ensured as well as the absence of disadvantageous tipping phenomena when the vegetation of the vine becomes thicker. Both closure positions are also quick to hook on and/or unhook.

According to alternative exemplary embodiments, there could also be several rings, similar to the rings 5 and 6, also adapted to receive the vine support wires, in such a way as to be able to vary the distance between the wires further and to ensure the maximum freedom of choice in where to run them. For the same reason, the hooks 7 and 8 may both be hooked on to the same recess 8 or 13, forming an asymmetric configuration.

The dimensions of the spacer illustrated in FIGS. 1, 2 and 3 may also be varied considerably in such a way as to adapt to posts of different dimensions, having an "omega"-shaped or similar cross-section, and equipped with recesses that are equidistant and/or at different distances.

The wide modularity of attachment in any case makes it possible with the same spacer to arrive at various different solutions in terms of distance between the rings 5 and 6.

According to an alternative embodiment shown in FIG. 4, at least one of the arms and preferably both the arms 3, 4 have in the upper portion which is comprised between the support rings 5, 6 and the hooks 7, 8 at least one loop 20 in the region of which the hook of the opposite arm can be hooked on. Similarly, the loops may be provided in the lower portion of the arms 3, 4 which is comprised between the support rings 5, 6 and the central ring 2.

The combination of possibilities for attachment, respectively to the recess of the post or to the loops of the arms, also heterogeneous, make it possible to adopt a vast range of possible configurations, including symmetrical configurations which are diverged or closed together to a greater or lesser degree, or asymmetrical configurations spaced further apart on any desired side of the vine.

According to further alternative embodiments, the lower portion of the arms 3, 4 which is comprised between the support rings 5, 6 and the central ring 2 may be formed in an arc shape instead of a straight line or, as shown in FIG. 5 in a variant of smaller overall dimensions, following a broken line comprising a first and a second straight segment 22, 23 which are connected, preferably at a right angle, in such a way that in at least one attachment configuration the spacer device has a lower straight segment 22 of each arm which is disposed in a predominantly vertical direction and facing the post, entirely contained within the shape of the post itself.

In a further alternative embodiment shown in FIG. 6, at least one of the arms has in the end part a hook portion 30 shaped in such a way as to encircle a section of post, according to the profile of the latter or according to a line enveloping the profile.

Advantageously, in this alternative embodiment the hook portion 30 adapted to encircle the post has the concavity facing on the opposite side from the concavity of the central ring 2, and the hook of the other arm is coupled thereto, running from the opposite side of the post with respect to the part encircled by the hook portion, so that the spacer in the closed state, i.e. hooked on to the post, is secured to the post from both directions in which the vine support wires extend, and is not subject to tipping in the presence of thick vegetation.

FIGS. 7, 8 and 9 illustrate a second embodiment of the device, optimised for a vineyard post 12 having a "T"-shaped cross-section (see the sections in FIG. 7a), and which has recesses 13 on one of the lateral edges. In this second embodiment, several attaching elements are provided in the first arm 3; there is a hook-shaped coupling means 71 placed at the end of the arm, and there is an attaching element 72 disposed along the arm and configured as a loop having in particular a width equal to the "T"-shaped cross-section of the post 12.

FIG. 7 illustrates the spacer in the open position hooked on to the post 12 in the lower part. The mode of attachment is the same as that indicated for the first embodiment. FIG. 8 illustrates the spacer in a first closure position in which the first arm 3 (slightly inclined downwards) is attached directly to the post 12 by means of the insertion of the hook 71 into one of the recesses 13 of the post 12 and in which the second arm 4 (slightly inclined downwards) is attached to the post 12 indirectly, the second arm 4 being hooked on to the first arm 3. In order to improve the stability of the attachment between the first and second arms 3, 4, the hook 8 of the arm 4 will be inserted into a suitable loop 31 of the first arm 3 which will be close to the post 12. In this configuration also, the device is firmly anchored to the post and cannot tip, even in the presence of thick vegetation.

FIG. 9 illustrates the spacer in a second closure position in which the function of attachment to the post 12 of the first arm 3 is performed by the attaching element 72: the loop fits round and grips the "T"-shaped cross-section of the post 12.

Also in this second closure position, the second arm 4 is attached to the post 12 indirectly, the second arm 4 being hooked on to the first arm 3. In order to improve the stability of the attachment between the first and second arm 3, 4, the hook 8 of the arm 4 will be inserted into a further loop 32 of the first arm 3. Also in this second closed configuration, the device is firmly anchored to the post and cannot tip, even in the presence of thick vegetation.

Also in this second form of embodiment, the variability of the distance between the rings 5 and 6 could be further increased by providing additional loops adapted to permit the closure of the spacer device in further positions, according to the amount of vegetation present and/or to the season.

Also in the case of the second form of embodiment, the dimensions of the spacer illustrated in FIGS. 7, 8 and 9 may also be varied considerably, in such a way as to adapt to posts of different dimensions, having a "T"-shaped or similar cross-section, and equipped with recesses that are equidistant and/or at different distances.

The wide modularity of attachment also makes it possible in the second form of embodiment to arrive at various different solutions in terms of distance between the rings 5 and 6 with the same spacer.

In a variant of the device, not shown, the loop element 31 may assume the double function of attaching element (for example in the second closure position) and of attached element (for example in the first closure position). In this variant, in order to ensure improved winding of the arm 4 around the post 12, the loops 31 and 32 could lie in a horizontal plane in a mirror-image with respect to each other, in such a way that in the first closure position the first arm 3 winds round the post 12 from in front and the second arm 4 winds round the post from behind, while in the second closure position the positions of the arms 3, 4 are reversed, that is, the first arm 3 winds round the post 12 from behind and the second arm 4 winds round the post 12 from in front. In this way, tipping phenomena are avoided in both closure positions.

The co-operation between spacer and post occurs, in the closed positions, both in the lower part and in the upper part of the spacer itself and is executed best with posts having an "omega"-shaped and "T"-shaped cross-section and provided with recesses.

In both embodiments shown, the attachment to the post takes place manually in a very rapid and simple manner and ensures a good hold.

The arms 3 and 4 could also assume an arc-shape, so that with the spacer closed the arms 3 and 4 themselves are substantially contained within the shape of the post (11 or 12 in the drawings of the present embodiments) without protruding therefrom to a considerable extent, and therefore limiting the overall dimensions of the spacer itself.

In order to ensure greater durability over time, the device may be made of steel, in particular of high strength type AISI 302 or high strength type AISI 630, and may be subjected to a stabilising process, which consists in binding the spacers with wire and overheating to 300 degrees for 20 minutes. The advantage lies in hardening the wire and increasing its life.

The invention claimed is:

1. A spacer device for vine support wires, configured to be fixed to a vine post, and made of wire, comprising:
a first ring configured to encircle the post in a substantially horizontal position and to co-operate with recesses of the post, and
a first and a second arm each extending from the first ring and each changing direction at an intermediate location thereof to form a loop, the loop respectively defining a second ring on the first arm and a third ring on the second arm, the second and the third ring being configured to receive and support vine support wires,
the first arm comprising a first hook located at an end of the first arm opposite to the first ring with respect to the loop, the second arm comprising a second hook located at an end of the second arm opposite to the first ring with respect to the loop,
the first hook being configured to hook on to a post in a region of an attachment seat of the post in order to couple the first arm directly to the post, and the second hook being configured to couple the second arm directly or indirectly to the post,
the second hook of the second arm being adapted to be hooked onto a region of the first arm between the loop on the first arm and the first hook, the region of the first arm between the loop on the first arm and the first hook being configured to receive the second hook of the second arm.

2. The spacer device according to claim 1, comprising a coil integral with the first ring, substantially perpendicular to the first ring, and configured to be disposed adjacent to the post.

3. The spacer device according to claim 1, wherein the second arm is adapted to be directly hooked on to the post in the region of a recess of the post via the second hook.

4. The spacer device according to claim 1, wherein the second hook of the second arm is adapted to be hooked on to the first hook of the first arm in a position close to the post.

5. The spacer device according to claim 1, wherein the first and the second arm both comprise at least one respective loop configured to receive the hook of the opposite arm.

6. The spacer device according to claim 1, wherein the spacer device is adapted to resiliently assume an open position in which both hooks are not coupled to the post or to an arm, and at least one closure position in which both hooks are coupled to the post or to an arm.

7. The spacer device according to claim 1, wherein the first and the second arm are shaped and the second and third rings are placed in an intermediate position respectively on the first and second arms.

8. The spacer device according to claim 1, wherein the portion of the arms which is comprised between the respective support ring and the central ring comprises a first and a second straight segment which are connected in such a way that in at least one attachment configuration the spacer device has a lower straight segment of each arm entirely contained within the shape of the post.

9. The spacer device according to claim 1, wherein the first arm has, in an intermediate position, at least one attaching element adapted to hook on to the post.

10. A vine support assembly, comprising at least one vine post, having an omega-shaped cross-section and provided with attachment seats along the lateral edges, and at least one spacer device for vine support wires according to claim 1, the spacer device being arranged to be mounted on the post and adapted to hook on to the post in the region of at least one attachment seat.

11. A vine support assembly, comprising at least one vine post, having a T-shaped cross-section, and at least one spacer device for vine support wires according to claim 1, the spacer device being arranged to be mounted on the post and adapted to hook on to the post-in the region of at least one attachment seat.

12. The spacer device according to claim 2, wherein at least one ring among the first, second, and third rings is a coil.

13. The spacer device according to claim 6, wherein the spacer device is configured to resiliently assume a first closure position in which the second and third ring are at a first distance and a second closure position in which the second and third ring are at a second distance, the first distance being different from the second distance.

14. The spacer device according to claim 13, wherein, both in the first closure position and in the second closure position, a horizontal distance between the second ring and the post is approximately equal to a horizontal distance between the third ring and the post.

15. A spacer device for vine support wires, configured to be fixed to a vine post, and made of wire, comprising:
 a first ring configured to encircle the post in a substantially horizontal position and to co-operate with recesses of the post, and
 a first and a second arm each extending from the first ring and each changing direction at an intermediate location thereof to form a loop, the loop respectively defining a second ring on the first arm and a third ring on the second arm, the second and the third ring being configured to receive and support vine support wires,
 the first arm comprising a first hook located at an end of the first arm opposite to the first ring with respect to the loop, the second arm comprising a second hook located at an end of the second arm opposite to the first ring with respect to the loop,
 the first hook being configured to hook on to a post in a region of an attachment seat of the post in order to couple the first arm directly to the post, and the second hook being configured to couple the second arm directly or indirectly to the post,
 wherein at least one of the arms has at one end a hook shaped portion configured to encircle a plurality of sides of the post according to the profile thereof or a line of envelopment of the profile, the hook portion having the concavity facing on the opposite side from the concavity of the first ring.

* * * * *